(No Model.)

J. J. McMILLEN.
INSECT DESTROYER.

No. 578,352. Patented Mar. 9, 1897.

Witnesses
W. J. LaVarre,
J. F. Riley

Inventor
James J. McMillen.

By his Attorneys,
C. A. Snow & Co.

UNITED STATES PATENT OFFICE.

JAMES J. McMILLEN, OF VAN WERT, OHIO.

INSECT-DESTROYER.

SPECIFICATION forming part of Letters Patent No. 578,352, dated March 9, 1897.

Application filed April 25, 1896. Serial No. 589,110. (No model.)

*To all whom it may concern:*

Be it known that I, JAMES J. MCMILLEN, a citizen of the United States, residing at Van Wert, in the county of Van Wert and State of Ohio, have invented a new and useful Insect-Destroyer, of which the following is a specification.

The invention relates to improvements in insect-destroyers.

The object of the present invention is to improve the construction of insect-destroyers, and to provide a simple, inexpensive, and efficient device designed to be placed in gardens, orchards, grain-fields, and the like, and adapted to attract and effectually exterminate insects which are destructive to vegetation.

The invention consists in the construction and novel combination and arrangement of parts hereinafter fully described, illustrated in the accompanying drawings, and pointed out in the claim hereto appended.

Figure 1:
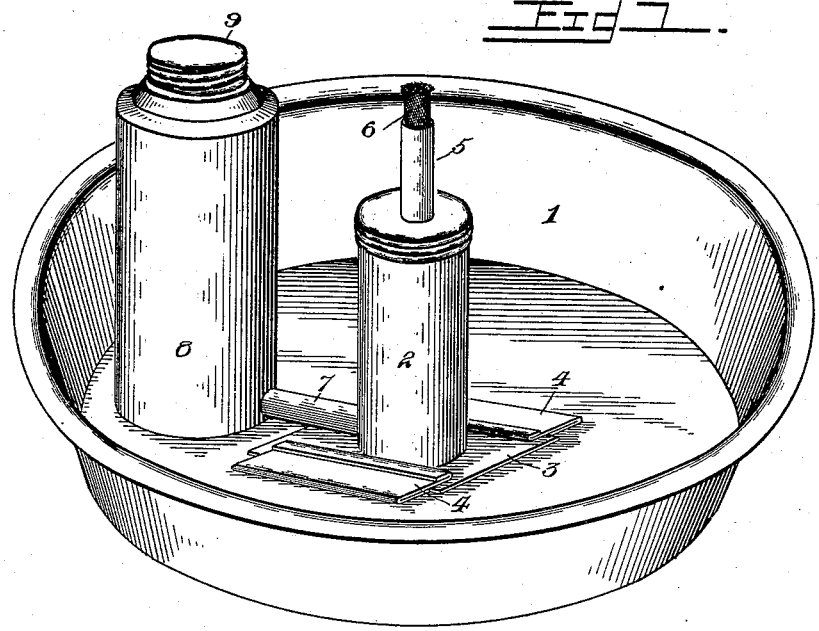
Figure 2:
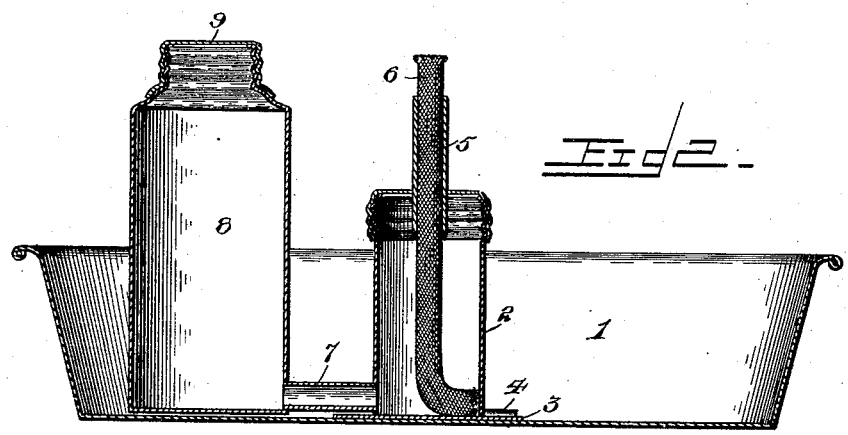
Figure 3:
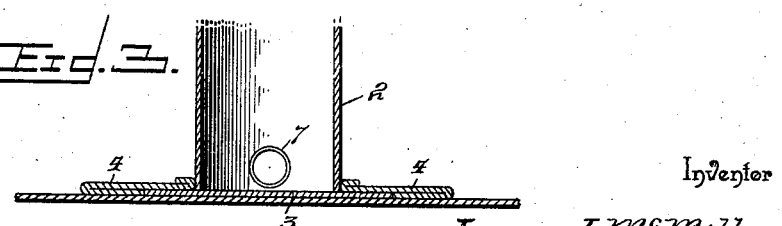

In the drawings, Figure 1 is a perspective view of an insect-destroyer constructed in accordance with this invention. Fig. 2 is a vertical sectional view. Fig. 3 is a detail sectional view illustrating the manner of detachably mounting the lamp and the reservoir in the receptacle.

Like numerals of reference designate corresponding parts in all the figures of the drawings.

1 designates a receptacle, such as a pan or the like, designed to be partially filled with water and to be provided with sufficient oil to form a film or coating over the surface of the water to destroy insects falling into the receptacle. The insects are attracted by a lamp 2, arranged vertically at the center of the receptacle and detachably connected with the same by means of a slide or plate 3, which is arranged in ways 4 of the bottom of the receptacle. The ways 4 consist of flanges or strips, soldered or otherwise secured to the upper face of the bottom of the receptacle, and the slide consists of a plate arranged flat against the bottom of the receptacle and soldered or otherwise secured to the lamp 2.

The lamp 2 preferably consists of a tubular or cylindrical body and is provided at its top with a burner 5, having a wick-tube and receiving a wick 6. The wick-tube is designed to be provided with a cap for extinguishing the light and to exclude moisture from the lamp when the latter is not in use and is exposed to the weather.

The body of the lamp is rigidly connected at its bottom by a horizontal tube 7 with a reservoir 8, consisting of a tubular or cylindrical body provided at its top with a screw-cap 9, adapted to be readily removed to enable the reservoir to be supplied with oil.

The device is designed to be placed at night in a garden, orchard, field, or the like. The light of the lamp will attract moths and other insects which destroy plants and the like, and insects falling into the receptacle, either through having their wings singed or through tiring from continual circling around the light, will be effectually destroyed by the oil at the top of the water.

It will be seen that the insect-destroyer is simple and comparatively inexpensive in construction, that it is positive and reliable in operation, and that the lamp in the reservoir may be readily detached from and replaced in the receptacle. It will also be apparent that by the particular construction of the lamp and the oil-reservoir the top of the lamp is located slightly above the upper edges of the pan, so as to draw insects close to the latter, and the lamp and the reservoir are adapted to contain a sufficient quantity of oil to enable the former to burn the entire night without refilling and without necessitating the lamp to be constructed of such size as to cause the burner to be located a considerable distance above the pan or other receptacle employed.

Changes in the form, proportion, and minor details of construction may be resorted to without departing from the principle or sacrificing any of the advantages of this invention.

What I claim is—

The combination of a receptacle provided on the upper face of its bottom with opposite parallel ways, a vertical lamp extending slightly above the upper edges of the receptacle and provided at its bottom with a horizontal plate forming a slide and fitting in the said ways, an oil-reservoir located beyond the ways and resting upon the bottom of the receptacle, and a horizontal tube rigidly connecting the reservoir and the lamp, located at the bottoms thereof and forming a passage for oil, substantially as described.

In testimony that I claim the foregoing as my own I have hereto affixed my signature in the presence of two witnesses.

JAMES J. McMILLEN.

Witnesses:
J. H. FOSTER,
E. M. QUILTER.